United States Patent [19]

van Bilzem et al.

[11] Patent Number: 4,461,029

[45] Date of Patent: Jul. 17, 1984

[54] AUTOMATIC HANDWRITTEN AND TYPEWRITTEN CHARACTER-READING DEVICE

[75] Inventors: Jan F. van Bilzem; Joannes van Staveren, Zoetermeer, both of Netherlands

[73] Assignee: Staat der Nederlanden (Staatsbedrijf der Posterijen, Telegrafie en Telefonie), The Hague, Netherlands

[21] Appl. No.: 319,206

[22] Filed: Nov. 9, 1981

[30] Foreign Application Priority Data

Nov. 14, 1980 [NL] Netherlands ............ 8006241

[51] Int. Cl.[3] .............. G06K 9/46; G06K 9/40; G06K 9/44
[52] U.S. Cl. ..................... 382/25; 382/54; 382/55
[58] Field of Search ............ 382/25, 38, 9, 54, 39, 382/61, 55

[56] References Cited

U.S. PATENT DOCUMENTS

| | | | |
|---|---|---|---|
| 3,694,807 | 9/1972 | Bond et al. | 340/146.3 SG |
| 3,781,801 | 12/1973 | Anderegg | 340/146.3 MA |
| 3,810,094 | 5/1974 | Mori et al. | 340/146.3 D |
| 3,832,682 | 8/1974 | Brok et al. | 340/146.3 ED |
| 3,895,350 | 7/1975 | DeVries | 340/146.3 D |
| 3,930,228 | 12/1975 | Spanjersberg | 382/9 |
| 3,999,161 | 12/1976 | Bilzem et al. | 382/25 |
| 4,162,482 | 7/1979 | Su | 382/55 |

FOREIGN PATENT DOCUMENTS 2313717 6/1976 France .

OTHER PUBLICATIONS

IBM Technical Disclosure Bulletin, vol. 15, No. 11, Apr. 1973.
IBM Technical Disclosure Bulletin, vol. 22, No. 10, Mar. 1980.
Proceedings of the Second International Joint Conference on Pattern Recognition of Aug. 13–15, 1974.

*Primary Examiner*—John C. Martin
*Assistant Examiner*—Michael D. Parker
*Attorney, Agent, or Firm*—Hugh Adam Kirk

[57] ABSTRACT

This disclosure concerns a system for automatically reading handwritten and typewritten characters. First, a 64×64 point image is made of each character. Then the size and any overlapping with an adjacent character is considered in determining whether the character is either handwritten or typewritten, the latter being smaller and not overlapping. To consider these properties, the image on the 64×64 point image area is moved into the upper lefthand corner of the area so that its top and lefthand edge of the image are in contact with the top and lefthand edge of the area for better determining the size of the image after overlapping, if any, has been eliminated. Next, each of the images on the 64×64 point image areas, is separated into four images having 32×32 image points which are stored in four separate registers. The four 32×32 point images correspond with each of the four points making up each square of four image points of the original 64×64 point image, which squares of four image points are homogeneously distributed over the total 64×64 point image area. By selecting successively or simultaneously the corresponding image points stored in one or more of these 32×32 point image stores or registers, each character can be enhanced, enlarged, sharpened, or widened so as to be better readable. The final detection of the character is made by comparison with separate learning means for the clasified typewritten and handwritten characters.

15 Claims, 20 Drawing Figures

FIG. 2
DOCUMENT

FIG. 3
THE NUMBER CHARACTERS
STORED FROM FIG. 2

FIG. 12
RECORDING STORE 3

CAMERA PICTURE
OF A CRESCENT LINE
FIG.4

AND - FUNCTION OF FIGS. 5-8

FIG.9

OR - FUNCTION OF FIGS. 5-8

FIG.10

FIG. 15
CIRCUIT FOR READING THE INTERMEDIATE STORE 10

FIG. 19
ADDRESS COUNTERS FOR TRANSFER CYCLE

FIG. 20
INFORMATION PROCESSOR
(PART OF IMAGE SEPARATOR 7)

AUTOMATIC HANDWRITTEN AND TYPEWRITTEN CHARACTER-READING DEVICE

BACKGROUND OF THE INVENTION

The invention relates to a device for the automatic reading of characters filled-in in boxes on a document, which device comprises a camera, as well as means for the digitalized transfer to a recording store of the character pattern information taken, a processor of the stored information, a features deriving device, and classification means which determine the class of the characters with the aid of a probability table.

A device of this kind is known from assignee's and applicants' Van Bilzen et al U.S. Pat. No. 3,999,161 issued Dec. 21, 1976. This device is meant for reading handwritten characters and is generally not suited for reading typewritten characters, which can occur among the handwritten characters. This is due to the fact that typewritten characters have properties which deviate too much from those of handwritten characters, and moreover, because they are usually considerably smaller.

So far it has been necessary to divide the documents at the beginning of the reading procedure by hand into typewritten and handwritten characters, and next to subject these two sorts of characters to a recognition method in two different and completely separated machines, which method is most proper for the sort of character already detected. The main drawback of such a method is that these completely separated ways, when used together require much man-power and equipment.

SUMMARY OF THE INVENTION

This invention provides an apparatus for automatically determining the sort of character to be read, i.e. handwritten or typewritten, at the beginning of the process, after which a circuit for deriving features irrespective of the sort of charactor is utilized. Then the classification of the character takes place with the aid of learning means dependent on the sort of character.

It is new that typewritten and handwritten characters are separated automatically and also that learning means are utilized when automatically reading typewritten characters. In order to do this the typewritten characters are enlarged so they will be better readable by machine, and then the same features used for handwritten characters can be used for classifying the typewritten characters.

The apparatus according to the invention is characterized in that the character pattern information in the recording store has a quantification of 64×64 image points per box area, i.e. the area in which each character would be written. The processor of this stored information is provided with:

1. an image separator for scanning the information of the total area of all the boxes to record the image of each character pattern in an image area of 128×64 image points, the images being shifted against corresponding edges of their image areas, 2. a decision circuit, which, on the ground of the result of the image separator (separation successful—separation unsuccesful) discriminates between typewritten characters and handwritten characters, 3. a geometric separator for separating the images of the handwritten characters, starting from four images each having 32×32 image points, each of which images is made up of the same image point from each successive square of four image points from the original image area of 64×64 image points. Thus four 32×32 image point areas are looked upon with such an edge that each area looked upon comprises 48×48 image points, for determining any overlapping of the character lines from its box, so that thus extended, the OR-function is determined for the geometrical separation, and 4. an intermediate store for recording the information from the geometric separator or from the image separator, if in at least one of them the separation has been successful, in which intermediate store the information can be found in four image areas of 32×32 image points, the character pattern in which areas are against the left hand and the upper edges of each area. Also means are provided which determine, on the ground of the dimensions of the character pattern, if the image can be enlarged and, consequently, enhanced, and, if this is the case, to execute the enhancement by making use of a preset combination of two or more images from the four image areas.

The processor is connected to the classification means through the deriving device and the classification means are such that on the ground of the information from the decision circuit, the class of the characters can be determined by means of a probability table of the occurrences of features of each character for typewritten characters and a probability table of the occurrences of features of each character for handwritten characters.

The apparatus according to the invention as described above can be extended by adding a comparator comparing the classification result in its significant value columns or positions (amount in guilders, amount in cents, account number) with that obtained in another way, such as by a human being or another reader, and by adding means for feeding back said classification result to the intermediate store in the case of lack of conformity, which intermediate store is provided with means for initiating a fresh recognition via another preset combination of two or more images.

BRIEF DESCRIPTION OF THE VIEWS

The above mentioned and other features, objects and advantages, and a manner of attaining them are described more specifically below by reference to an embodiment of this invention shown in the accompanying drawings, wherein.

DETAILED DESCRIPTION OF A PREFERRED EMBODIMENT

I. The General Apparatus and Its Function

Figure 1:
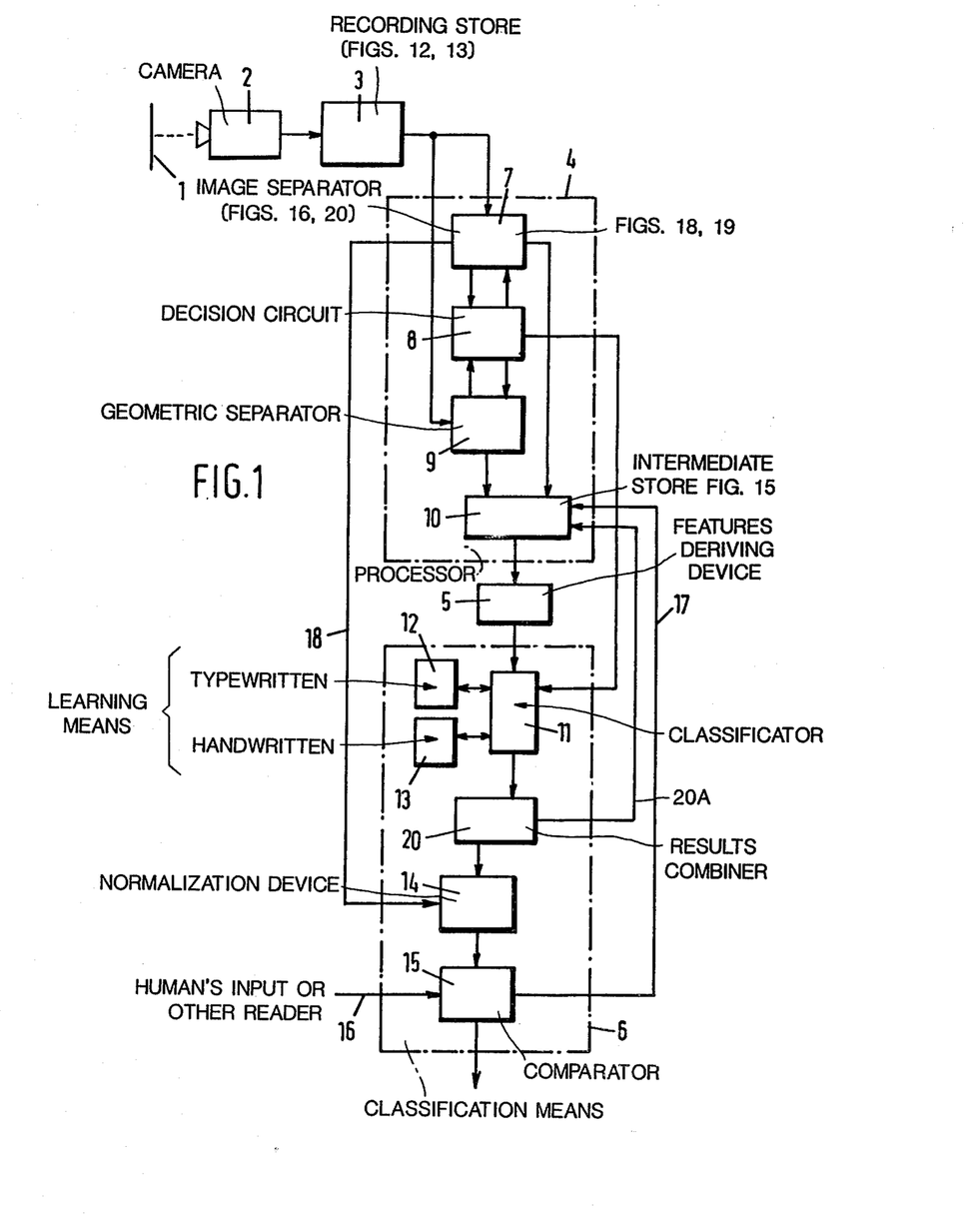
FIG. 1 is a schematic block wiring diagram of an apparatus according to a preferred embodiment of this invention.

FIG. 1 shows a document 1, a scanning device such as a camera 2, a recording store 3, a processor 4, a features deriving device 5 and classification means 6 in the sequence of processing the information from the document 1 according to the known technique, with the difference that a quantification of 64×64 image points per box area is made use of instead of a quantification of 32×32 image points per box area.

In this system 256×512 bits (FIG. 3) have to be stored in the frame period of 20 ms. This can only be realized with stores available since 1978. Meant are semiconductor stores which are recorded directly (so without shift registers) bit after bit in a very short time. In the following whole system, however, four stores each with only 32×32 bits or image points are used, which four stores are derived from the 64×64 point image box by selection of one point from each of the four points in each four point square making up the 64×64 bit area (see the squares of four bits in FIG. 12).

Figure 4:
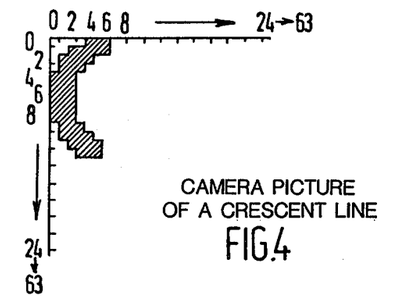
FIG. 4 is a video camera picture of a crescent-shaped line in the upper left corner of an image area with a quantification of 64×64 image points.
Figure 5:
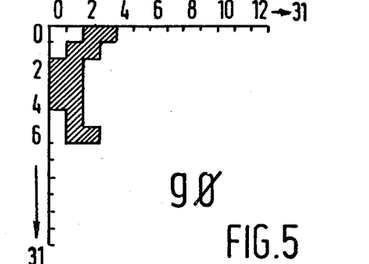
FIGS. 5 through 8 show the four 32×32 image points stored for each area of the corresponding four image points in successive squares of four image points of the image shown in FIG. 4 or 11.
Figure 6:
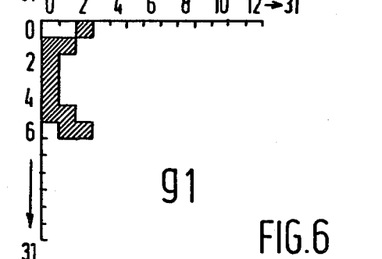
Figure 7:
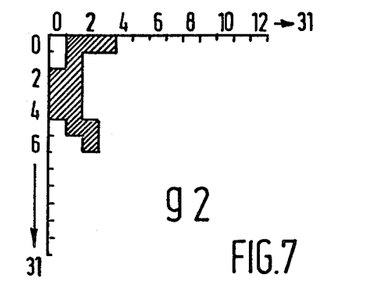
Figure 8:
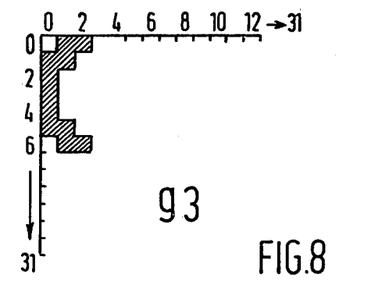
Figure 9:
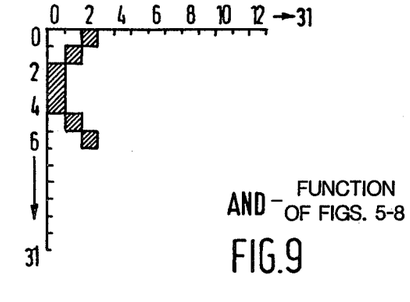
FIG. 9 shows the AND-function of the four image stores in FIGS. 5 through 8.
Figure 10:
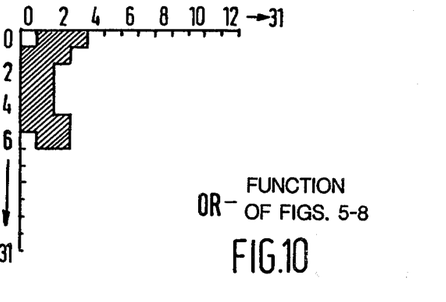
FIG. 10 shows the OR-function of the four image stores in FIGS. 5 through 8.

All the information of the first image line (a crescent line) (FIG. 4) is transferred by turns to the stores g0 (FIG. 5) and g1 (FIG. 6); all the information of the second image line is transferred by turns to the stores g2 (FIG. 7) and g3 (FIG. 8) and so forth. In this way four alternative patterns, as it were, of all the characters will be obtained (per character (FIG. 4) as in FIGS. 5-8), of which, in the case of recognition, advantage can be taken in various ways. By determining for instance the AND-function of these four stores, the image of the character to be examined will be slimmed, whereby the inconvenient noise disappears (FIG. 9). With the aid of the OR-function of these four stores, the image of the character will be thickened (FIG. 10). Thus, with the recognition, one may automatically start from separate images (FIGS. 5-8) or from one or more combinations of two to four images, such as combinations of g0 g1, g0 g2, g0 g3, g1 g2, g1 g3, g2 g3, g0 g1 g2, g0 g1 g3, g0 g2 g3, g1 g2 g3, or g0 g1 g2 g3, by means of "AND" and-/or "OR" gating circuit functions.

If the dimensions of a character pattern are so small that it fits within a frame of 32×32 image points in the pattern of 64×64 image points, it will be possible to supply the information of this frame recorded in the stores g0–g3 to a 32×32 bits store, thus doubling its size horizontally and vertically. This is the case with the character pattern according to FIG. 11. The character pattern of FIG. 4 has been enlarged and because of the larger amount of information it is enhanced, the information being as enhanced as it would have been with a pattern of 64×64 image points. So the image according to FIG. 11 in a store of 32×32 bits entirely corresponds to that of the quantized camera picture according to FIG. 4. This is of great importance for the recognition of typewritten characters and small handwritten characters and their separation from normal-sized larger handwritten characters.

Figure 2:
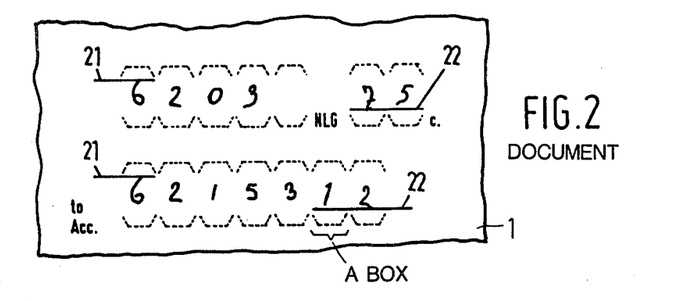
FIG. 2 is a part of a document with data relating to the invention, such as handwritten Arabic number characters.
Figure 3:
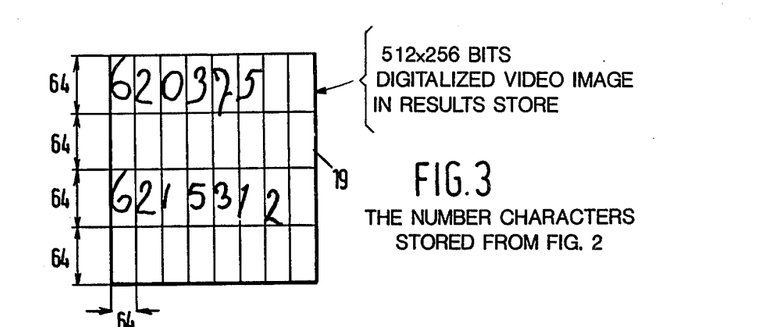
FIG. 3 is an illustration of all the character image areas in FIG. 2 as stored in the contents of a results store according to the apparatus of this invention.

The processor 4 comprises an image separator 7, a decision circuit 8, a geometric separator 9 and an intermediate store 10. The image separator 7 works with the total image of all the boxes together. The highest level (line 21) and the lowest level (line 22) of each of the two writing lines found in this image are determined (FIG. 2). In a second cycle the respective images are distinguished per writing line and recorded box after box in a results store 19 (FIGS. 16, 18 and 19), in such a way that the images in each box lie against the left-hand edge of each box (FIG. 3). So in a horizontal direction the images are shifted with respect to each other. In a vertical direction, however, the differences in height between the images of each line remain unaltered. The whole line is moved upward until the highest point in the line lies against the upper edge of the row of image areas for that line, in consequence of which the distance between the lines is changed (FIG. 3). Also, for each character pattern there are twice the vertical as horizontal (128×64) image points available in the results store. Before the image information is transferred by the image separator 7, the box number (or location of rectangular area in which each figure is written in the document 1, see FIG. 2) is recorded in the results store 19, in which the information of the most left-hand cent box of the document is recorded, for the sake of normalization, that is to make the necessary distinction between guilders and cents, and to define the position of the figures or characters making up the numbers.

The information of the images separated in the way as described above is transferred to the decision circuit 8, which concludes, on the ground of set criteria, if the images in the results store 19 concern typewritten characters. One of such criteria can be for instance the extent of the differences in height of the images and that none of the characters overlap each other. The information of the typewritten characters will now be transferred to the intermediate store 10 via the image separator 7, or, in the case of handwritten characters, information will again be taken from the recording store and transferred to the geometric separator 9, which starts from a total amount of information of 32 boxes per document (FIGS. 2 and 3), 64×64 image points corresponding to each box (FIG. 3 128×64!).

Figure 11:
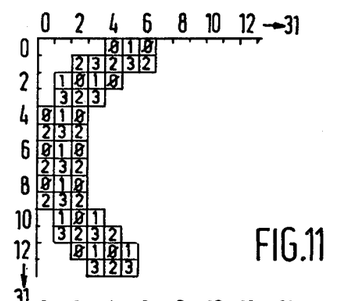
FIG. 11 is an enlarged representation of the same crescent line image shown in FIG. 4 showing the 32×32 camera image points selected for the stores g0, g1, g2 and g3 shown in FIGS. 5, 6, 7 and 8, respectively.

The method of separating the character patterns by the geometric separator 9 is identical to the method described in assignee's U.S. Pat. to Spanjersberg No. 3,930,228, issued Dec. 30, 1975, apart from the fact that instead of the original images of 48×48 image points (32×32+an edge of 8 image points) the "OR-function"-image of the four separate images (g0, g1, g2, g3) of 48×48 image points is now used (FIG. 11). In this way the four respective images are separated simultaneously. The information from the geometric separator 9 can now also be supplied to the intermediate store 10, provided this has not already been done by the image separator 7. In the intermediate store 10 the information per character pattern area of 64×64 image points is recorded in four image areas of 32×32 image points in the same way as in the recording store described above, i.e. in such a way that in the image areas of 32×32 image points, the image lies against the left-hand and the upper edges of each image area.

Means have been provided for determining on the ground of the dimensions of the character pattern if the image can be enhanced. If this is the case, the enhancement will be realized by making use of a preset combination of two or more images. Now the images, enhanced or not, in the image areas of 32×32 image points are supplied to the features deriving device 5, which is known in itself from the before-mentioned van Bilzem et al U.S. Pat. No. 3,999,161.

The features derived in the features deriving device 5 are supplied to a classificator 11, which on the ground of the information from the decision circuit 8 makes use of learning means 12 (typewritten characters) or of learning means 13 (handwritten characters), and which supplies the results to a results combiner 20, which combines the results of several recognitions of one and the same character pattern, via a feedback path 20A to the intermediate store (10) permitting the application of several different image combinations and a different adjustment of the features deriving device.

By means of for example a majority decision, a recognition result is obtained, which is led to a normalization device 14. By means of the results combiner 20 a more reliable recognition result is obtained. In the normalization device 14 the characters found receive the correct address or signification in the amounts in guilders and in cents and in the account number by means of data received from the image separator 7 via a line 18.

The contents of the normalization device 14 can be supplied to a comparator 15, which compares the classification result with the result obtained by a human being or the operator or other reading device (arrow 16). If the results are different, a fresh recognition can take place, via a feedback 17 to the intermediate store 10, by means of another preset combination of character patterns as shown in FIGS. 5–8. It is also possible to compare the results of the recognitions of various combinations of character patterns with each other, as a result of which a more reliable recognition result or a higher recognition score can be obtained.

II. Specific Processor Apparatus

Figure 12:
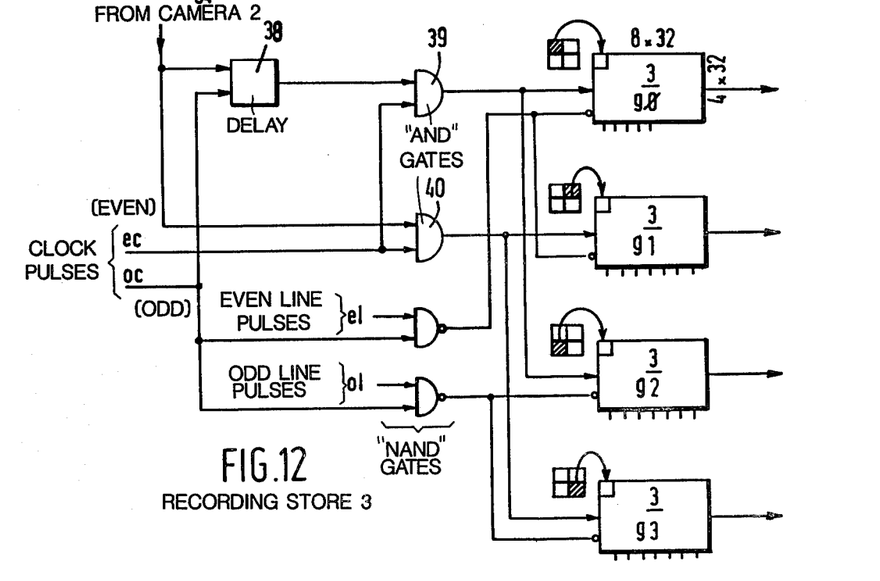
FIG. 12 is a schematic block wiring diagram of the recording store for storing separately each of the four points of the squares of points to form the images g0, g1, g2 and g3 of FIGS. 4 through 8.
Figure 13:
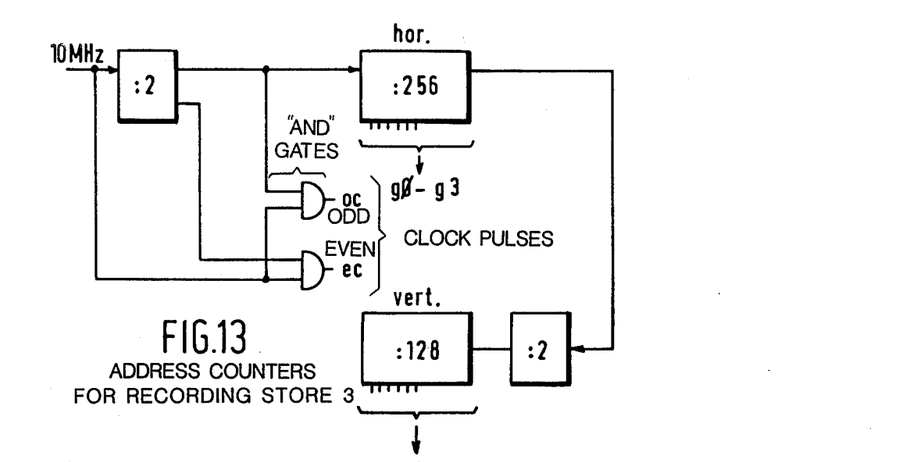
FIG. 13 is a schematic block wiring diagram of the address counters for the recording store shown in FIG. 12.

The above will be further described in more detail with the help of block diagrams shown in FIGS. 12 through 20. The digitalized video image (512×256 bits) will be recorded in the recording store 3, consisting of four parts g0, g1, g2 and g3 (each consisting of 256×128 bits), the four parts containing information equally spread over the video image according to the squares taken from the video image and which squares each also consist of four parts, image points, or bits, as shown in FIG. 12. The supply of "even" and "odd" clock pulses for the successive point selection of each square is indicated by ec and oc input lines, respectively.

A delay circuit 38 delays a supplied pulse from the video image until this pulse is passed on simultaneously with an odd clock pulse, as a result of which the addressing (see circuit FIG. 13) of all of the four partial stores will take place in parallel. The numbers 39 and 40 in FIG. 12 designate AND-gates. The supply of a pulse during an even line or an odd line is indicated by el and ol, respectively.

The image separator 7, the geometric separator 9 and the intermediate store 10 comprise stores which are formed in the same way as the store 3, to wit of four store areas in which are respectively;
even bits of even lines (g0),
odd bits of even lines (g1),
even bits of odd lines (g2), and
odd bits of odd lines (g3).

Figure 14:
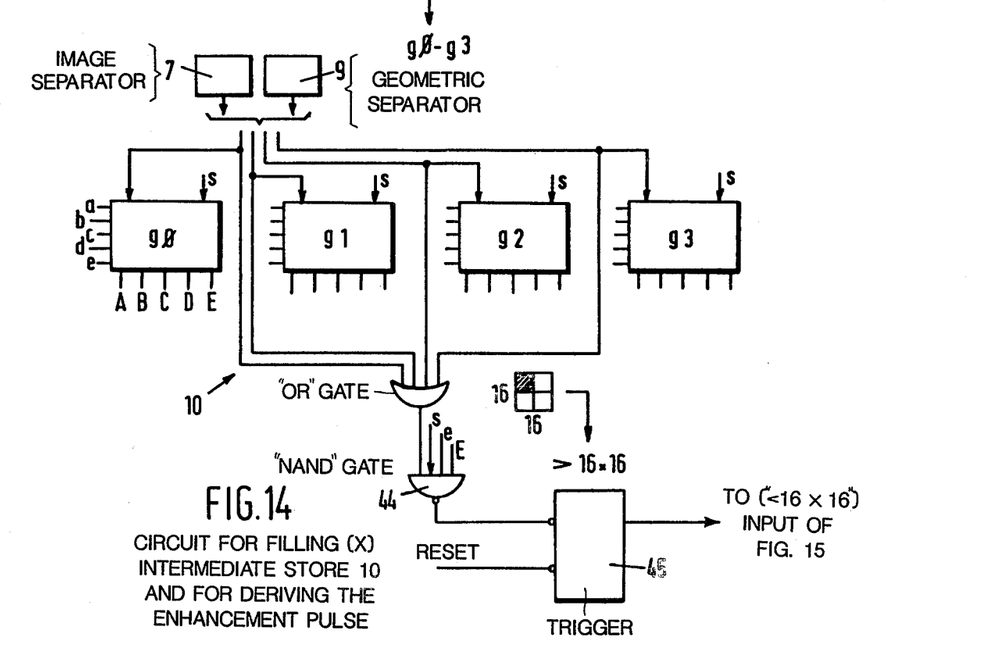
FIG. 14 is a schematic block wiring diagram of the circuit for filling the intermediate store shown in FIG. 1 and deriving the enhancement pulse.
Figure 15:
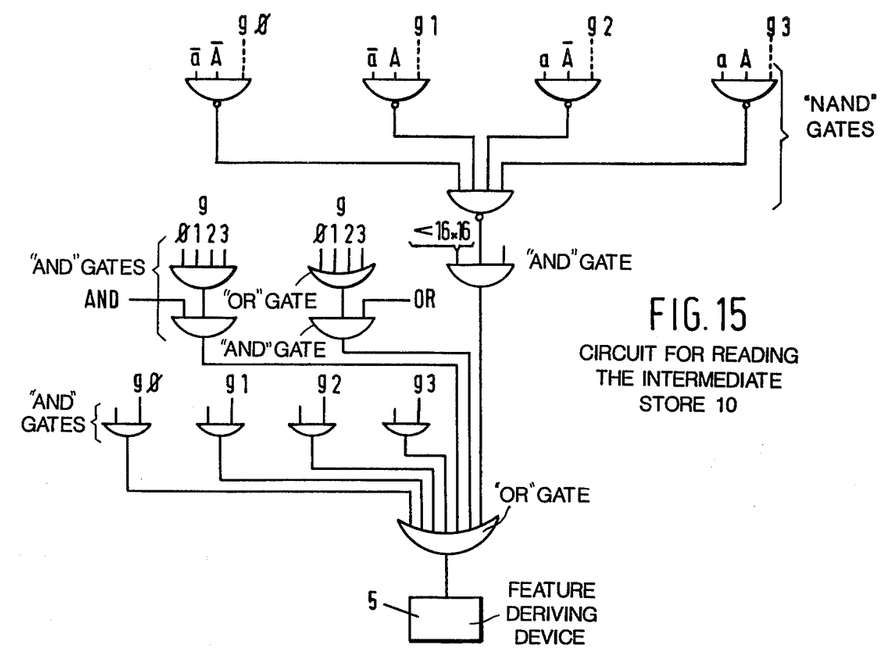
FIG. 15 is a wiring diagram of the logic circuit for reading the intermediate store shown in FIG. 14 and controlling the feature deriving device shown in FIG. 1.

During the processing of these images in the image separator 7 and in the geometric separator 9, the OR-function of the four images is used to determine how the separation in the four stores has to take place. After the separation process, the four images are transferred to the intermediate store 10, which also consists of four parts (FIG. 14). When the information from one character is transferred to the 32×32 bits store in the features deriving device 5, single images or combinations of several images can be used (FIG. 15).

During the filling process of the intermediate store 10 it is determined whether the image of the OR-function of the four images with which this intermediate store is filled, is larger than 16×16 bits per signal. If there is information during the addressing of the addresses 16 or higher of the horizontal addressing $E=2^4$ and of the vertical addressing $e=2^4$ (FIG. 14), the pattern is apparently larger than the hatched part (inset FIG. 14). The output of the gate 44 sets a trigger 45. Writing inputs are designated by s, and R designates a reset input for resetting the trigger 45 at the beginning of the filling process of the intermediate store 10. The image always lies shifted against the left-hand and the upper sides of the matrix and can therefore be "enlarged", if required. This enlarging is achieved by dividing both the horizontal (A, B, C, D, E) and the vertical (a, b, c, d, e) addressing by 2 during the reading of the intermediate store 10. The letters (A, B, C, D, E) and (a, b, c, d, e) represent the inlets for the bits of binary address words each of 5 bits (horizontal and vertical, respectively). A and a represent the value $2^0$; B and b represent the value $2^1$; and so on, to: E and e representing the value $2^4$. With these address words of 5 bits each the points of a 32×32 matrix can be addressed. See for example g0 in FIGS. 5 and 14. This takes place by replacing the addressing a–3 ($2^0$–$2^4$) and A–E ($2^0$–$2^4$) by bcde "1" and BCDE "1", respectively. Instead of the address aA there are now four addresses, indicated in FIG. 15 by $\overline{aA}$ and so on. Next one of the four images, the OR-function, the AND-function or the enhanced image can be transferred to the 32×32 matrix in the features deriving device 5 at the command of a computer. The enhanced image is formed by alternately reading an image element from the stores g0 and g1 of the intermediate store 10 and at the next line by alternately reading an image element from the stores g2 and g3 of this intermediate store 10 (FIG. 15). The recording cycle is characterized by the following: The recording store 3 (FIGS. 1, 12, 16) is filled line after line with the digitalized and quantized camera picture.

Figures 16, 17:
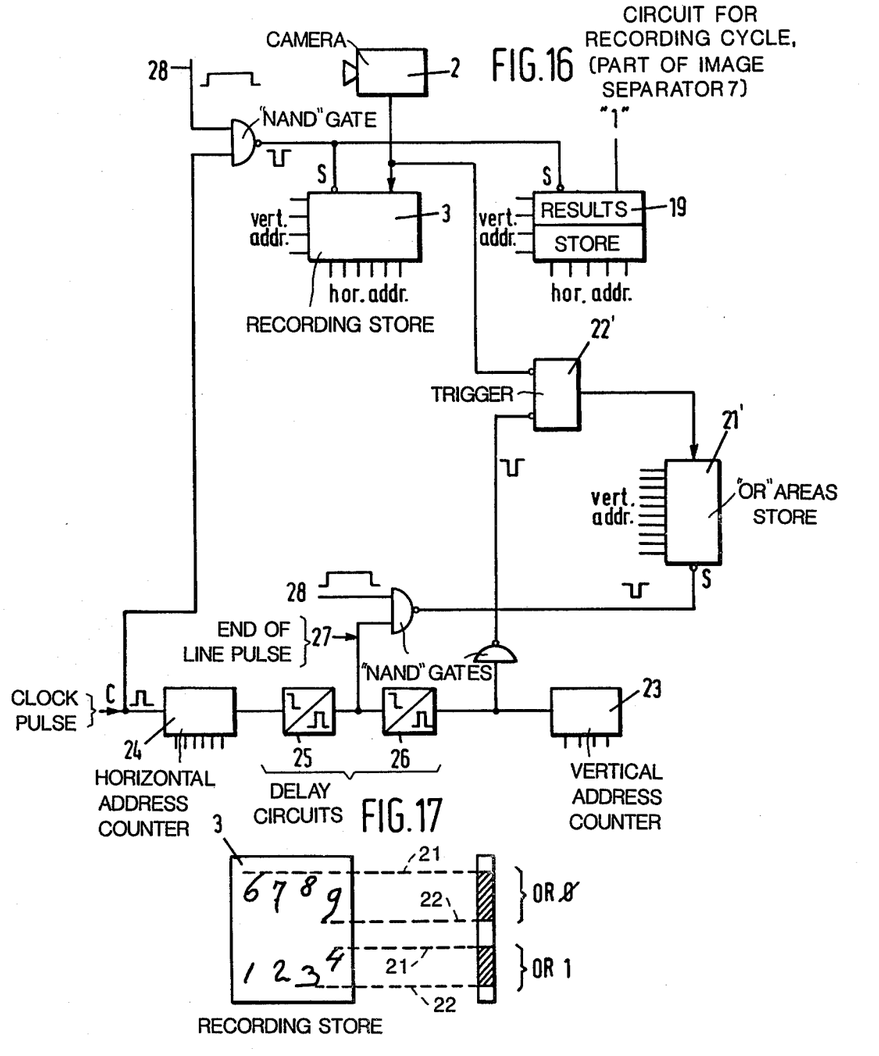
FIG. 16 is a more detailed schematic block wiring diagram of the circuits of FIG. 1 used for a recording cycle.
FIG. 17 is an illustration of the OR-areas of the total amount of relevant document information in the recording store.

The results store 19 of the image separator 7, which store consists of two halves, is filled with "ones", that is it is "erased", in consequence of which the separated image of the preceding recording will disappear. An "OR"-areas 21–22 store 21' (FIG. 16) is filled with the information of the OR-function of the image which is recorded in the store 3 (FIGS. 16, 17).

III. Operation of the Processor

When the signal coming from the camera 2 (see FIGS. 16, 17) becomes "low", which means that there is image information, a trigger 22' will be set. The signal "end of line" (input 27) records during the "recording" (input 28) the output signal of the trigger 22' in the OR-areas store 21' in the same vertical position as in which the store 3 is addressed at that moment. Immediately after this, the trigger 22' is reset by the delayed pulse and a vertical address counter 23 makes a step, after which (by means of an "end of line"-pulse via input line 27 also) a next line comes to its turn. FIG. 16 further shows a horizontal address counter 24, a clock input c, delay circuits 25, 26 and writing inputs s. Apart from the camera 2 and the store 3 the circuit according to FIG. 16 forms part of the image separator 7.

Figure 18:
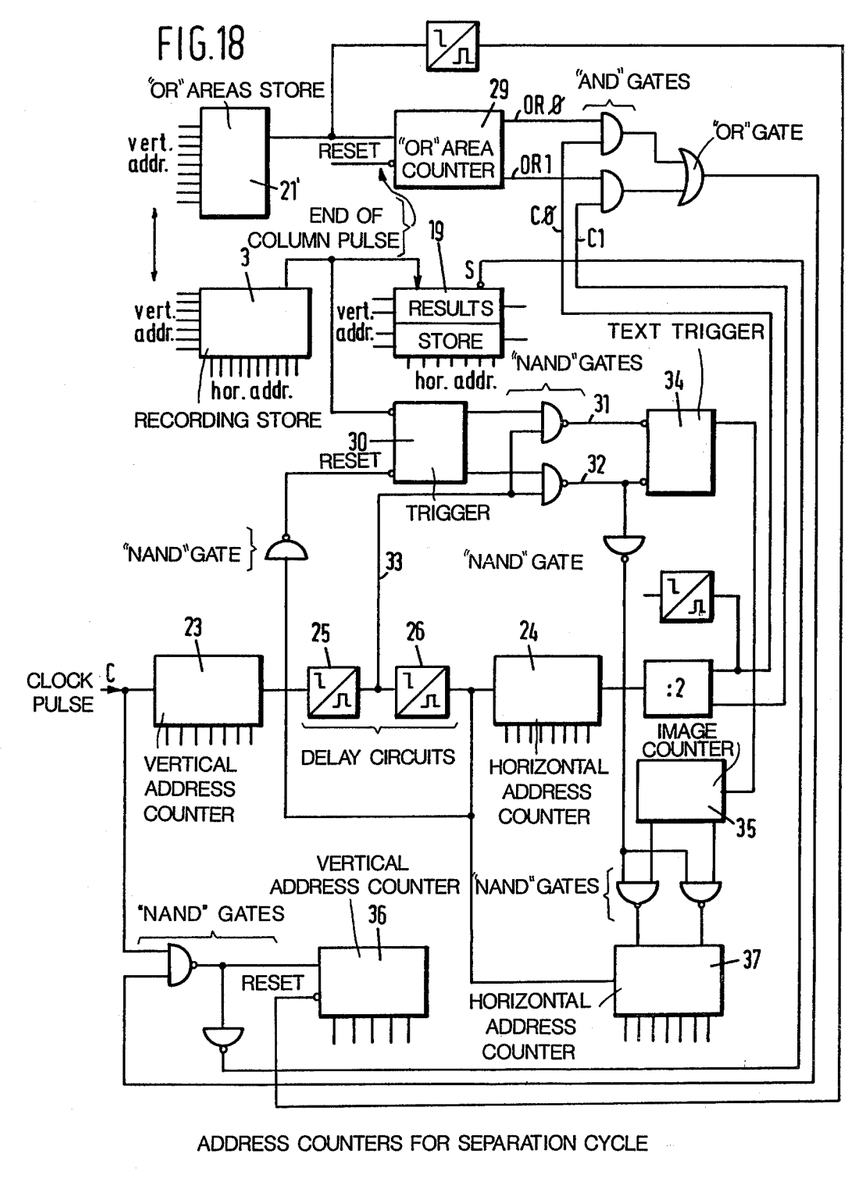
FIG. 18 is a more detailed schematic block wiring diagram of the circuits in FIG. 1 used for a separation cycle.
Figure 19:
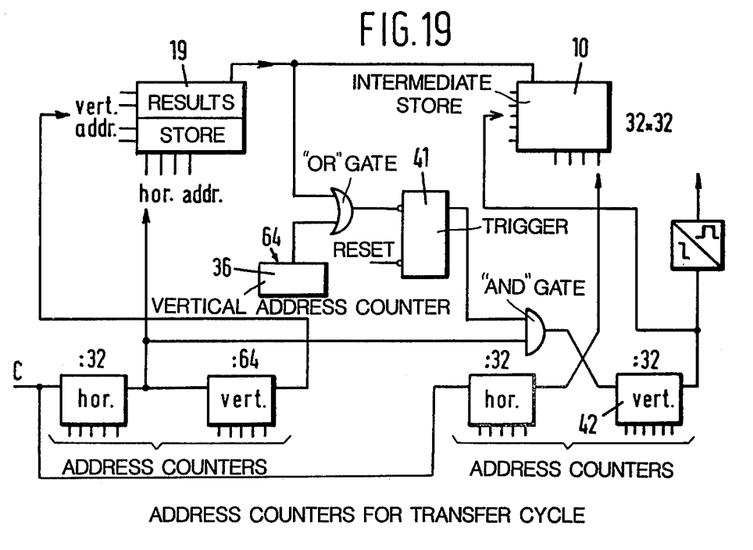
FIG. 19 is a more detailed schematic block wiring diagram of the circuits in FIG. 1 used for a transfer cycle.

The addressing of the store 3 takes place by means of the counters 23,24 (see FIG. 18). During the reading of the store 3, the OR-areas store 21' (FIG. 18) is read as well, and the OR-areas are counted by a counter 29, which blocks after two OR-areas and is reset by an "end of column" pulse. The address counters 23, 24 for the store 3 run two times. During the first time (cycle 0) the upper half of the results store is selected and during the second time (cycle 1) the lower half (FIG. 18 c0 and c1). The output signal of the recording store 3 is connected to a trigger 30, which is reset every time at the end of a column. Just before this reset, it is scanned by means of a pulse via a line 33 what the state of the trigger was. The signals "end of black column" and "end of white column" thus formed control, via the lines 31 and 32, respectively, a next trigger 34, which delivers the clock pulse for an image counter 35. A vertical address counter 36 of the results store 19 starts running only when the OR-area 0 appears in cycle 0 or the OR-area 1 in cycle 1. In consequence of this the copying of the contents of the store 3 is always started column after column at the beginning of the relevant OR-function. The vertical address counter 36 blocks after 64 clock pulses.

In a horizontal sense the images are shifted against the edge of the box because of the fact that the horizontal address counter 37 of the results store 19 is always reset to the edge of the box determined by the state of the image counter 35, as long as white columns are being read in the recording store 3. As soon as columns containing black present themselves, the horizontal address counter 37 of the results store 19 will start running. During the box-after-box transfer of the information from the results store 19 to the intermediate store 10 (FIGS. 14, 19) the separate images are shifted against the upper edge of the box in the following way. In the results store 19 a box is read line after line. As soon as there appears information at the output of the results store 19 a trigger 41 (FIG. 19) will be set and the vertical address counter 42 of the intermediate store 10 will start running. Until that moment the upper line of the intermediate store was always used for writing. As soon as the counter 42 starts running, it will have to make 32 steps, no matter how far the box in the results store 19 has already een read, since the contents of the intermediate store 10 have to be completely renewed in order to overwrite the preceding pattern entirely. So the counter 42 determines when the transfer has finished. If a box in the results store 19 is empty, the trigger 41 will nevertheless be reset in the state "64" of the vertical address counter 36 and the counter 42 will start running as far as the state 31 inclusive.

Figure 20:
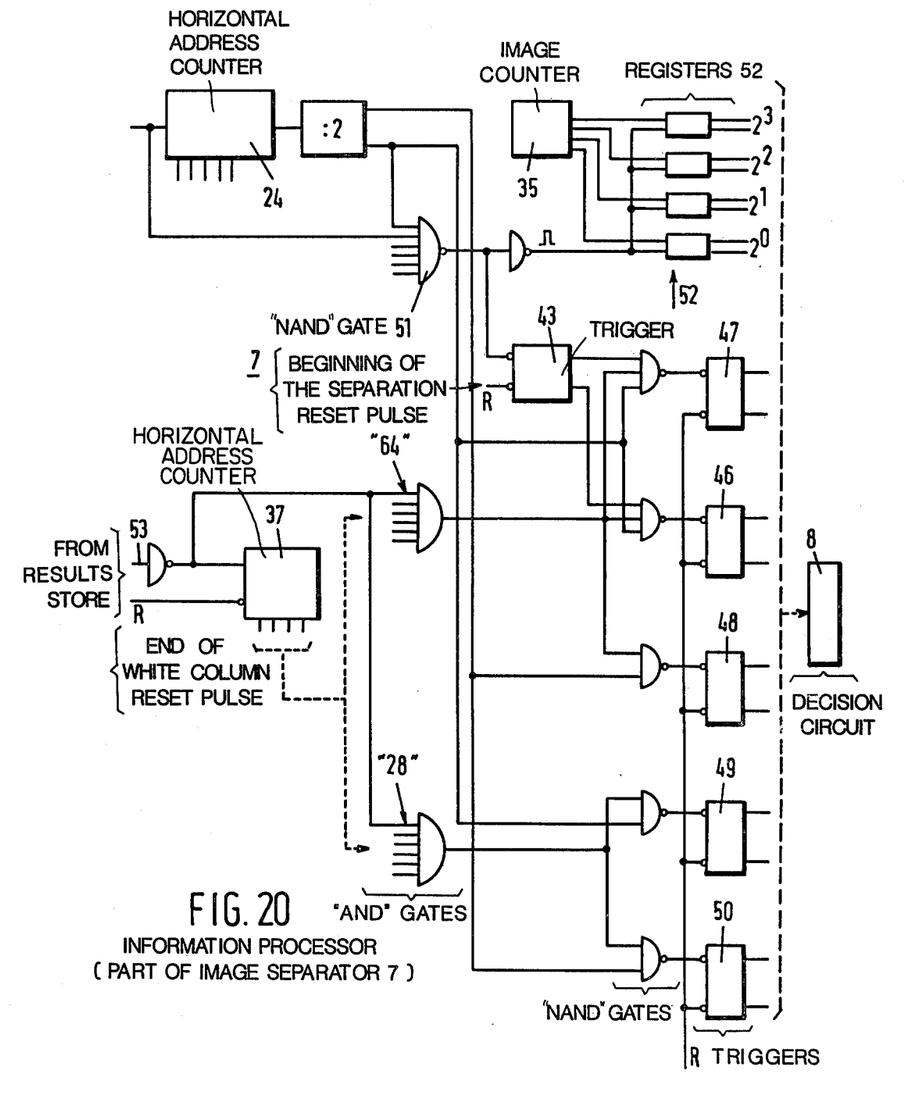
FIG. 20 is a more detailed schematic block wiring diagram of the circuits in FIG. 1 used for processing of the value information concerning guilders (or dollars) and cents.

FIG. 20 shows the way in which value data concerning the guilders and the cents are transferred from the image separator 7 to the decision circuit 8. These data (some of which are not shown) are:

- width of one or more of the separate images in the boxes on the left side of the indication NLG in FIG. 2 (guilder boxes) is larger than 64 image points (FIG. 3): via a trigger 46;
- width of one or more of the separate images in the boxes on the right side of the indication NLG in FIG. 2 (cents boxes) is larger than 64 image points: via a trigger 47;
- width of one or more of the separate images in the boxes of the bottom line in FIG. 2 (account number boxes) is larger than 64 image points: via a trigger 48;
- height of one or more of the separate images in the boxes of the top line in FIG. 2 (guilder boxes together with cents boxes) is larger than 64 image points: via a trigger not shown in FIG. 20;
- height of one or more of the separate images in the boxes of the bottom line in FIG. 2 (account number boxes) is larger than 64 image points: via a trigger not shown in FIG. 20;
- dimensions of the image $>28\times26$ image points top line via a trigger 49;
- dimensions of the image $>28\times26$ image points bottom line via a trigger 50;
- number of images $>8$ in top line by means of the image counter 35;
- number of images $>8$ in bottom line by means of the image counter 35;
- box number first c. (cent)-box (this is the fifth character in a box in the results store 19 (FIG. 3)).

The dimensions of the image $28\times26$ image points have been determined by experiment; by means of this datum the decision circuit determines if whether the relevant image concerns typewritten characters or handwritten characters.

The position and the associated state of the horizontal address counter 24 (see FIG. 20) are known in the recording store 3. During the first separating cycle c0 the relevant state is output via gate 51 and a trigger 43 is set in the state "NLG-box passed". Before the trigger 43 is set, the guilder boxes are read or, as the case may be, separated. After the trigger 43 has been set the same occurs with the cent boxes. The trigger 43 is reset (R) by a "beginning of the separation" pulse. At the moment when the "NLG"-box passes, the state of the image counter 35 is recorded in a register 52, which can be read by the computer, in consequence of which the position of the cent box, in the row of numbers separated in the top line, is known.

The whole area of the black columns is moreover counted (input 53 of the horizontal address counter 37 of the results store) from which it can be deduced if one of the images exceeds a certain width. The counter 37 is reset (R) by an "end of white column" pulse.

While there is described above the principles of this invention in connection with specific apparatus, it is to be clearly understood that this description is made only by way of example and not as a limitation to the scope of this invention.

We claim:

1. A system for automatically reading characters filled-in in boxes on a document comprising:
   (A) scanning each of said boxes to form an area of 64×64 image points,
   (B) recording all of said points of all of said boxes,
   (C) separating the characters so that one character only is recorded in each image area of 64×64 image points,
   (D) moving the image recorded in each 64×64 image area into the upper lefthand corner of its image area,
   (E) separately storing the four adjacent image points in squares of four image points, which squares are homogeneously distributed over each said 64×64 point image area to produce four corresponding separate records of 32×32 image point areas for each character, and
   (F) selecting at least one of said separate records of 32×32 image point areas for enhancing the image of a character to improve its readability.

2. A system according to claim 1 wherein said characters comprise handwritten and typewritten characters.

3. A system according to claim 2 wherein said selecting of said separate records of 32×32 image point areas are successive for enlarging the image of a character.

4. A system according to claim 1 wherein said selecting of said four separate records of 32×32 image point areas is through an "OR" function for enhancing the image of a character.

5. A system according to claim 1 wherein said selecting of said separate records of 32×32 image point areas is through an "AND" function for sharpening the image of a character.

6. A system according to claim 1 including deriving features of the enhanced selected record of the character image.

7. A system according to claim 4 including classifying the character according to the derived features by means of a probability table.

8. A system for automatically reading characters filled-in in boxes on a document comprising:
   (A) scanning each of said boxes to form an area of 64×64 image points,
   (B) recording all of said points of all of said boxes,
   (C) separating the characters so that one character only is is recorded in each image area of 64×64 image points,
   (D) moving the image recorded in each 64×64 image area into the upper lefthand corner of its image area,
   (E) separately storing the four adjacent image points in squares of four image points, which squares are homogeneously distributed over each said 64×64 image point area, to produce four corresponding separate records of 32×32 image point areas for each character,
   (F) selecting at least one of said separate records of 32×32 image point areas for enhancing the image of a character to improve its readability,
   (G) deriving features of the enhanced selected record of the character image, and
   (H) classifying the character according to the derived features by means of a probability table.

9. A system according to claim 8 comprising distinguishing between handwritten and typewritten characters on the ground of preset criteria.

10. A system according to claim 9 wherein said classifying is executed by means of two probability tables, one for handwritten and one for typewritten characters.

11. A system according to claim 10 wherein said selecting of said separate records of 32×32 image point areas are successive for enlarging the image of a character.

12. A system according to claim 8 wherein said selecting of said four separate records of 32×32 image point areas is through an "OR" function for enhancing the image of a character.

13. A system according to claim 8 wherein said selecting of said separate records of 32×32 image point areas is through an "AND" function for sharpening the image of a character.

14. A system according to claim 8 comprising combining results of several classifications of one and the same character on the ground of other selected records of the character image.

15. A system according to claim 14, comprising comparing the result of said combining with a classification result of the same character obtained in another way and in case of lack of conformity initiating a new feature deriving and classifying procedure on ground of other selected records of the character image.

* * * * *

UNITED STATES PATENT AND TRADEMARK OFFICE
CERTIFICATE OF CORRECTION

PATENT NO. : 4,461,029
DATED : July 17, 1984
INVENTOR(S) : Jan Frederik Van Bilzem et al It is certified that error appears in the above-identified patent and that said Letters Patent are hereby corrected as shown below:

Column 6, line 59, change "a-3" to -- a-e --.

Column 8, line 7, change "een" to -- been --.

Signed and Sealed this

Nineteenth Day of February 1985

[SEAL]

Attest:

DONALD J. QUIGG

Attesting Officer     Acting Commissioner of Patents and Trademarks